United States Patent
Bang

(10) Patent No.: US 9,778,045 B2
(45) Date of Patent: Oct. 3, 2017

(54) METHOD FOR MANAGING SERVICE SCHEDULE OF VEHICLE

(71) Applicant: LG CNS CO., LTD., Seoul (KR)

(72) Inventor: Inseok Bang, Seoul (KR)

(73) Assignee: LG CNS CO., LTD., Seoul (KR)

( * ) Notice: Subject to any disclaimer, the term of this patent is extended or adjusted under 35 U.S.C. 154(b) by 92 days.

(21) Appl. No.: 14/585,037

(22) Filed: Dec. 29, 2014

(65) Prior Publication Data

US 2016/0189438 A1    Jun. 30, 2016

(51) Int. Cl.

| | |
|---|---|
| B61L 27/00 | (2006.01) |
| G01C 21/26 | (2006.01) |
| B61L 25/02 | (2006.01) |
| B61L 25/00 | (2006.01) |
| G06Q 10/00 | (2012.01) |
| G01C 21/20 | (2006.01) |
| G08G 1/127 | (2006.01) |

(52) U.S. Cl.
CPC ............ *G01C 21/26* (2013.01); *B61L 25/00* (2013.01); *B61L 25/02* (2013.01); *B61L 27/00* (2013.01); *B61L 27/0033* (2013.01); *B61L 27/0077* (2013.01); *G01C 21/20* (2013.01); *G06Q 10/00* (2013.01); *G08G 1/127* (2013.01)

(58) Field of Classification Search
CPC ......... B61L 27/0011–27/0033; B61L 27/0077; B61L 25/00–25/026; B61L 27/00; G06Q 10/04–10/08
See application file for complete search history.

(56) References Cited

U.S. PATENT DOCUMENTS

| | | | | |
|---|---|---|---|---|
| 4,133,505 A | * | 1/1979 | Bongiorno | B61L 3/185 191/2 |
| 5,836,529 A | * | 11/1998 | Gibbs | B61L 27/0022 246/122 R |
| 6,631,322 B1 | * | 10/2003 | Arthur | B61L 27/0027 340/991 |
| 2003/0139876 A1 | * | 7/2003 | Shinagawa | G01C 23/005 701/454 |
| 2003/0236598 A1 | * | 12/2003 | Villarreal Antelo | B61L 25/025 701/19 |
| 2004/0093245 A1 | * | 5/2004 | Matheson | B61L 27/0016 701/19 |
| 2008/0068164 A1 | * | 3/2008 | Campbell | B61L 3/125 340/572.1 |
| 2010/0114406 A1 | * | 5/2010 | DeJonge | G01C 23/00 701/3 |
| 2014/0288821 A1 | * | 9/2014 | Modica | G06Q 50/30 701/465 |
| 2017/0061794 A1 | * | 3/2017 | Nishimura | B61L 25/02 |

FOREIGN PATENT DOCUMENTS

EP        2733042 A2 *  5/2014  ............ B61L 3/006

\* cited by examiner

*Primary Examiner* — Genna Mott

(57) ABSTRACT

A method for managing a service schedule of a vehicle includes receiving the service schedule of the vehicle that travels along a predetermined route from a control server, generating first service information of the vehicle based on position information of the vehicle, generating service state information of the vehicle based on the service schedule and the first service information, and displaying the service state information of the vehicle using a user interface.

18 Claims, 9 Drawing Sheets

|  | FIRST NODE | | SECOND NODE | | THIRD NODE | |
|---|---|---|---|---|---|---|
|  | EXPECTED ARRIVAL | ACTUAL ARRIVAL | EXPECTED ARRIVAL | ACTUAL ARRIVAL | EXPECTED ARRIVAL | ACTUAL ARRIVAL |
| 1ST VEHICLE | 8:00 | 8:00 | 8:15 | 8:12 | 8:30 | 8:29 |
| 2ND VEHICLE | 8:20 | 8:18 | 8:35 | 8:32 | 8:50 | 8:52 |
| 3RD VEHICLE | 8:40 | 8:44 | 8:55 | 8:54 | 9:10 | 9:10 |
| 4TH VEHICLE | 9:00 | 9:02 | 9:15 | 9:20 | 9:30 | 9:35 |

FIG. 2A

|  | SERVICE STATE | | |
|---|---|---|---|
|  | FIRST NODE | SECOND NODE | THIRD NODE |
| 1ST VEHICLE | 0 | -3 | -1 |
| 2ND VEHICLE | -2 | -3 | +2 |
| 3RD VEHICLE | +4 | -1 | 0 |
| 4TH VEHICLE | +2 | +5 | +5 |

FIG. 2B

|  | SERVICE INTERVAL | |
|---|---|---|
|  | TIME DIFFERENCE | DISTANCE |
| 1ST VEHICLE↔2ND VEHICLE | 0:18 | 2.0km |
| 2ND VEHICLE↔3RD VEHICLE | 0:16 | 2.2km |
| 3RD VEHICLE↔4TH VEHICLE | 0:18 | 1.7km |

FIG. 2C

METHOD FOR MANAGING SERVICE SCHEDULE OF VEHICLE

TECHNICAL FIELD

Various embodiments described in the present specification relate to methods for managing a service schedule of a vehicle that travels along a predetermined route.

BACKGROUND

Various techniques for managing a service schedule of a vehicle are disclosed. For example, Korean Patent Laid-open Publication No. 2013-0025052 discloses a performance evaluation system for bus information announcements. The system disclosed in Korean Patent Laid-open Publication No. 2013-0025052 includes an image capturing unit that captures and provides a bus image of a bus arriving at a bus stop, a communication module that receives the bus image provided from the image capturing unit and transmits bus information to a bus information terminal, an information extracting unit that extracts actual bus service information by using the bus image, and a comparing/verifying unit that evaluates accuracy by comparing the actual bus service information extracted by the information extracting unit with the bus information transmitted through the bus information terminal.

SUMMARY

Various embodiments described in the present disclosure are directed to a method and system for efficiently managing a service schedule of a vehicle.

In an embodiment, a method of a service scheduling device includes receiving, from a control server, a service schedule of a first vehicle traveling along a predetermined route, generating first service information of the first vehicle based on position information of the first vehicle, generating service state information of the first vehicle based on the service schedule and the first service information, and displaying the service state information of the first vehicle on a user interface.

In an embodiment, a method of managing a service schedule includes transmitting the service schedule from a control server to a first vehicle of one or more vehicles that travel along a predetermined route, receiving service information from the first vehicle by the control server, generating service state information of the first vehicle based on the service schedule and the service information by the control server, and displaying the service state information of the first vehicle on a user interface by the control server. The service information is generated based on position information of the first vehicle.

In an embodiment, a system for managing a service schedule of a vehicle includes a processor, an output device, and a non-transitory computer-readable medium having stored thereon a program that, when executed, causes the processor to perform a method. The method includes receiving a service schedule of a first vehicle that travels along a predetermined route from a control server, generating first service information of the first vehicle based on position information of the first vehicle, generating service state information of the first vehicle, based on the service schedule and the first service information, and displaying the service state information of the first vehicle on a user interface of the output device.

According to embodiments described in the present disclosure, the service schedule of the vehicle can be efficiently managed through punctuality information and service interval information.

Furthermore, according to embodiments described in the present disclosure, a control server can efficiently manage the service schedule of one or more vehicles through punctuality information and service interval information.

Moreover, according to embodiments described in the present disclosure, the control server can evaluate the service of the vehicle through punctuality evaluation information and efficiently manage the service schedule of the vehicle.

BRIEF DESCRIPTION OF THE DRAWINGS

FIGS. 2A to 2C are tables illustrating an example of a process of generating service state information and service interval information according to an embodiment.

DESCRIPTION OF EMBODIMENTS

Figure 1:
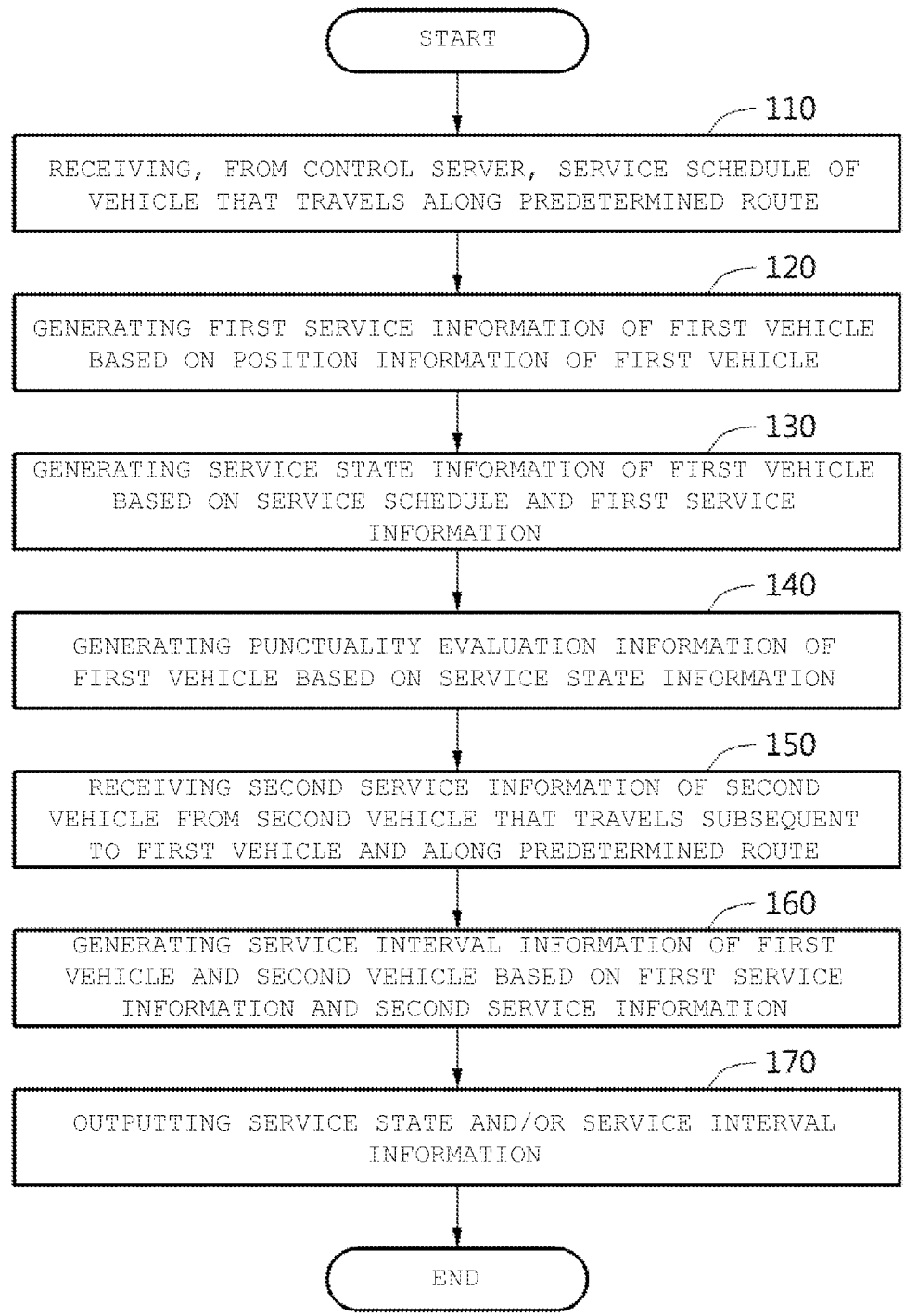
FIG. 1 is a flowchart illustrating a method for managing a service schedule of a vehicle according to an embodiment.

Hereafter, embodiments of the present disclosure will be described below with reference to the accompanying drawings. In the accompanying drawings, like reference numerals may refer to like elements and duplicated descriptions thereof may be omitted.

Various modifications of embodiments of the present disclosure are possible.

In this disclosure, it should be understood that the meaning of "include/comprise" or "have" specifies a property, a figure, a step, a process, an element, a component, or a combination thereof described in the disclosure, but does not exclude one or more other properties, numbers, steps, processes, elements, components, or combinations thereof.

FIG. 1 is a flowchart illustrating a method for managing a service schedule of a vehicle according to an embodiment.

Figure 8:
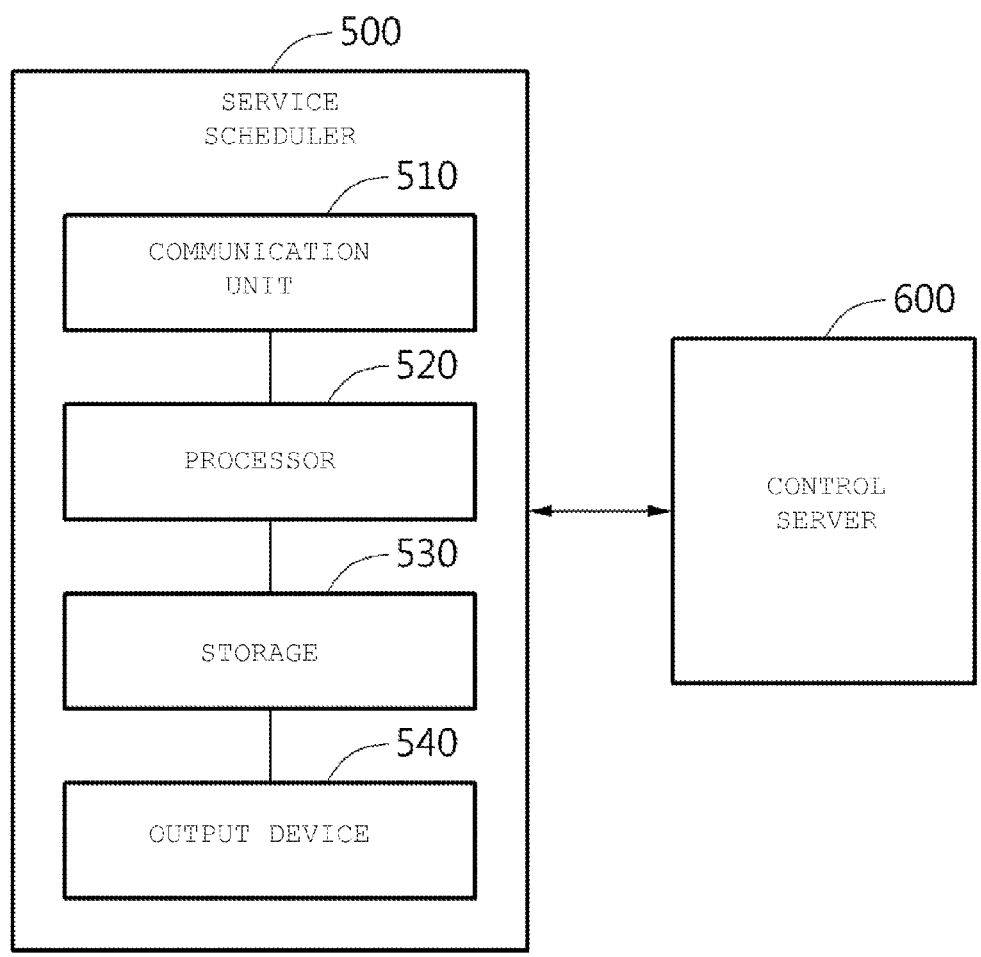
FIG. 8 is a block diagram illustrating a service scheduling device according to an embodiment.

In an embodiment, a method for managing a service schedule as described in accordance with embodiments of the present disclosure is performed by a service scheduling device 500 shown in FIG. 8. The service scheduling device 500 may be installed in the vehicle to provide a vehicle operator with information associated with the service schedule. In the present disclosure, the term "vehicle" refers to a vehicle used in various modes of transportation. For example, a vehicle may include a bus, train, streetcar, electric motor coach, subway train, tram, automobile, two-wheeled vehicle, ship, airplanes or other type of vehicle, which travel along a predetermined route.

Hereinafter, a service scheduling method performed by a service scheduling device 500 in accordance with embodiments, will be described with reference to FIGS. 1 to 4 and FIG. 8.

Referring to FIGS. 1 and 8, at step 110, the service scheduling device 500 receives, from a control server 600, a service schedule of a first vehicle that travels along a predetermined route. In an embodiment, the predetermined route includes a plurality of nodes, and the plurality of nodes includes stations and intersections. In an embodiment, the service schedule includes expected arrival times of the first vehicle that respectively correspond to the plurality of nodes included in the predetermined route. Each of the expected arrival times refers to a time at which the first vehicle is scheduled to arrive at a corresponding one of the plurality of nodes to provide efficient service. In an embodiment, the control server 600 generates the expected arrival times.

At step 120, the service scheduling device 500 generates first service information of the first vehicle based on position information of the first vehicle. First service information refers to service information of the first vehicle, so as to distinguish from service information of another vehicle. In an embodiment, the service information includes arrival times of the first vehicle that respectively correspond to the plurality of nodes. The arrival times of the service information refers to actual arrival times of the first vehicle, which is generated based on the position information of the first vehicle. In an embodiment, a position collecting device installed in a vehicle generates the position information of the vehicle. For example, the position collecting device generates the position information of the vehicle using any of a global positioning system (GPS) method, a radio frequency identification (RFID) method, an ultrasound method, a network method, or a combination thereof. The network method may include any of a Cell ID method, a time of arrival (ToA) method, an angle of arrival (AOA) method, or a combination thereof.

At step 130, the service scheduling device 500 generates service state information of the first vehicle based on the result of comparison between the service schedule and the first service information. The service state information indicates whether the first vehicle adheres to the service schedule while traveling along the predetermined route. In an embodiment, the service state information includes time difference information or distance information. In an embodiment, the service state information indicates whether the first vehicle is temporally delayed as compared to the service schedule or whether the first vehicle deviates from an expected position based on the service schedule. For example, the service state information includes a time difference between the expected arrival time of the first vehicle at a node and the actual arrival time of the first vehicle at the node. Based on the time difference of the expected and actual arrival times, which are included in the service schedule and in the first service information, respectively, the service scheduling device 500 determines whether the first vehicle adheres to the service schedule.

At step 140, the service scheduling device 500 generates punctuality evaluation information of the first vehicle based on the service state information. The punctuality evaluation information indicates the vehicle's degree of error in adhering to the service schedule. Generating punctuality evaluation information will be described in more detail below with reference to FIG. 7.

At step 150, the service scheduling device 500 receives second service information of a second vehicle that travels along a predetermined route. Although the second vehicle may be traveling before or after the first vehicle, for convenience of description, the second vehicle may herein be referred to as a "subsequent vehicle". The second vehicle refers to a vehicle that travels along the same route as the first vehicle after the first vehicle. In an embodiment, the service scheduling device 500 receives the second service information from the control server 600 or directly from the subsequent vehicle. In an embodiment, the second service information includes actual arrival times of the subsequent vehicle at each of the plurality of nodes.

At step 160, the service scheduling device 500 generates service interval information of the first vehicle and the second vehicle, based on the result of comparison between the first service information and the second service information. In an embodiment, the service interval information includes at least one of time difference information and distance information between the first vehicle and the second vehicle. That is, the service interval information includes service intervals between the first vehicle and the second vehicle represented in terms of time or distance. In an embodiment, the service interval information includes distance information based on the position information of the first vehicle and the subsequent vehicle. In an embodiment, the service interval information includes the time difference information and/or distance information corresponding to all of the plurality of nodes disposed along substantially the entire length of the route of the first and subsequent vehicles. In an embodiment, the service interval information includes the time difference information and/or distance information corresponding to a specific node. For example, the service interval information may include time difference information based on the actual arrival times of the first vehicle and the subsequent vehicle at the specific node. The service state information and the service interval information will be described below in more detail with reference to FIGS. 2A to 2C.

FIGS. 2A to 2C are tables illustrating an example of a process of generating service state information and service interval information according to an embodiment. FIGS. 2A, 2B, and 2C show specific figures for purposes of illustration, and are not intended to be limiting of embodiments. FIGS. 2A, 2B, and 2C illustrate expected and actual arrival times of a plurality of vehicles, service states of the plurality of vehicles, and service intervals of the plurality of vehicles, respectively, in accordance with an embodiment. In FIGS. 2A to 2C, first to fourth vehicles travel along a predetermined route including first to third nodes.

In FIG. 2A, each of the expected arrival times indicates a time at which a vehicle is scheduled to arrive at a corresponding node based on the service schedule. Each of the actual arrival times indicates a time at which the vehicle actually arrives at the corresponding node. The first to fourth vehicles travel through the first to third nodes at specific time intervals. As illustrated in FIG. 2A, the expected arrival times and the actual arrival times may be different at corresponding nodes.

In FIG. 2B, the service state information indicates whether each of the first to fourth vehicles adheres to the service schedule while traveling along the predetermined route. In FIG. 2B, the service state information includes time difference information. In this embodiment, as shown in FIG. 2B, the service state information includes a plurality of service states, each of which corresponds to a time difference between the expected and actual arrival times at a corresponding node. Here, "+" indicates that the vehicle arrives at a node after the expected arrival time. Thus, a "+" indicates the vehicle is traveling slower than the service schedule. On the other hand, a "−" indicates that the vehicle arrives at a node before the expected arrival time, and thus indicates the vehicle is traveling faster than the service schedule. A service state having a value of "0" indicates that the vehicle arrives at a node at substantially the same time as the expected arrival time, and thus, the vehicle is traveling as planned according to the service schedule.

In FIG. 2C, the service interval information includes a plurality of service intervals, each of which corresponds to a time difference or a distance between two consecutive vehicles. In an embodiment, the service interval corresponds to a specific point in time or a specific position. The specific position may refer to any one node among the plurality of nodes included in the predetermined route. In FIG. 2C, the service intervals in the first column are calculated as the difference between the actual arrival times of two consecutive vehicles at the first node. Specifically, the first service interval (e.g., 0:18) corresponds to the difference between the actual arrival time (e.g., 8:00) of the first vehicle and that of the second vehicle (e.g., 8:18) at the first node. The second service interval (e.g., 0:16) corresponds to the difference between the actual arrival time of the second vehicle (e.g., 8:18) and that of the third vehicle (e.g., 8:44) at the first node. In FIG. 2C, the service intervals in the second column each correspond to a distance between two consecutive vehicles and are represented in terms of length at predetermined point of time (e.g., km). For example, the service intervals in the second column may be measured when the second vehicle arrives at the same node. In an embodiment, the service intervals, which each correspond to a distance between two consecutive vehicles, are represented in terms of the number of nodes (e.g., stations or intersections) between the vehicles. The service interval information may be generated with respect to various points in time or various positions. Although not illustrated in FIG. 2C, service intervals between the first vehicle and the third vehicle, service intervals between the first vehicle and the fourth vehicle, and service intervals between the second vehicle and the fourth vehicle may also be generated.

Referring back to FIG. 1, at step 170, the service scheduling device 500 outputs the service states and/or the service intervals. Outputting the service states and/or the service intervals will be described in more detail with reference to FIGS. 3 and 4.

Figure 3:
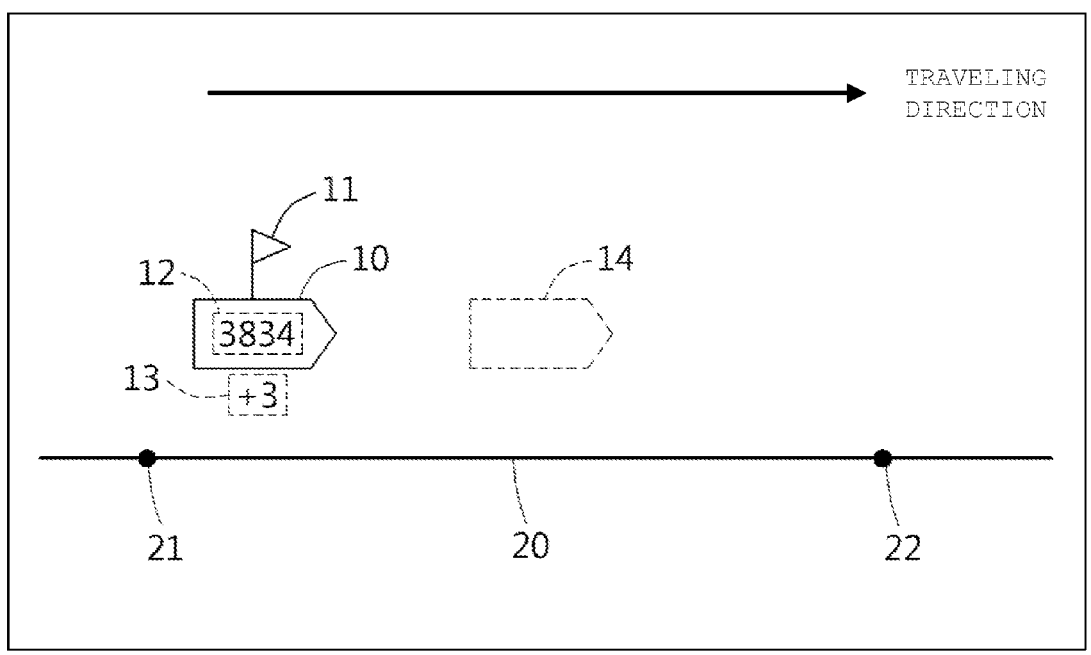
FIG. 3 is a diagram illustrating a user interface for displaying service state information according to an embodiment.

FIG. 3 is a diagram illustrating a user interface displaying service state information in a screen 30 according to an embodiment. Referring to FIG. 3, a first indicator 10 indicates an actual position of a vehicle traveling along a predetermined route 20, and a second indicator 14 indicates an expected position of the vehicle based on the service schedule. In an embodiment, the first indicator 10 includes a state indicator 11 that indicates a service state of the vehicle, identification information 12 of the vehicle, and service state information 13 of the vehicle. The predetermined route 20 includes a first node 21 and a second node 22.

In an embodiment where the vehicle travels slower than the service schedule, the service state information 13 includes a positive symbol "+" and the state indicator 11 points in the direction of the vehicle's travel. For example, as shown in FIG. 3, the state indicator 11 has a triangular shape pointing in the direction of travel of the vehicle. In an embodiment where the vehicle travels faster than the service schedule, the service state information 13 includes a negative symbol "−" and the state indicator 11 points in a direction opposite to the direction of the vehicle's travel. The magnitude of the delay indicated in the service state information 13 represents a difference between the actual position of the vehicle based on the service information and the expected position of the vehicle based on the service schedule.

FIGS. 2 and 3 illustrate examples of embodiments. However, embodiments are not limited to the examples illustrated. Those skilled in the art will understand that various modifications may be made. For example, in other embodiments, a "+" may indicate that a vehicle is ahead of schedule while a "−" indicates that a vehicle is behind schedule.

Figure 4:
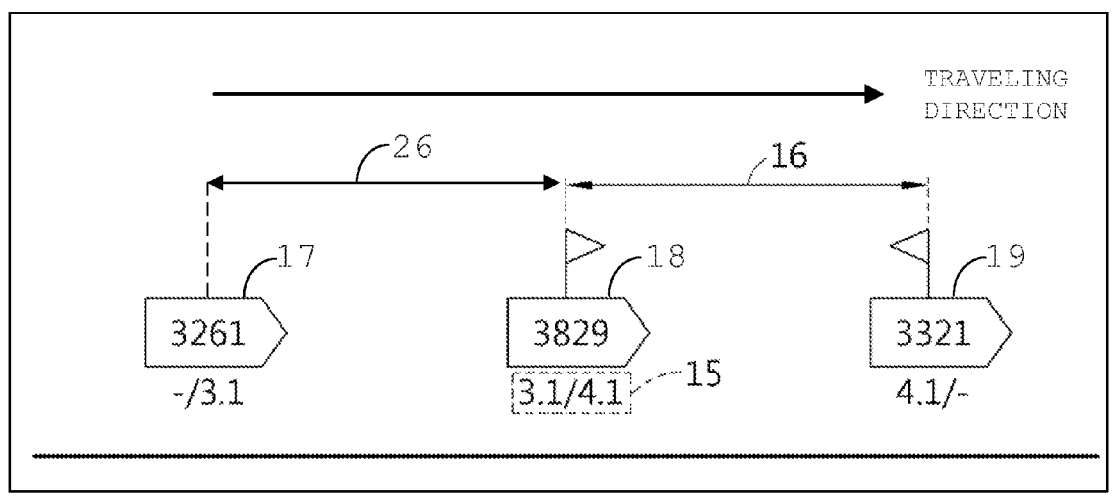
FIG. 4 is a diagram illustrating a user interface for displaying service interval information according to an embodiment.

FIG. 4 is a diagram illustrating a user interface for displaying service interval information in a screen 30 according to an embodiment. Referring to FIG. 4, a plurality of indicators 17, 18, and 19 indicates service states of corresponding vehicles 3261, 3829, and 3321 and an interval indicator 15 indicates first and second service intervals 16 and 26 between two consecutive vehicles. In an embodiment, the interval indicator 15 includes two numbers each representing the first and second service intervals 16 and 26. For example, in FIG. 4, the first number "3.1" represents the second interval 26 between the middle vehicle 3829 and the rear vehicle 3261 vehicle, and the second number "4.1" represents the first interval 16 between the middle vehicle 3829 and front vehicle 3321. In an embodiment, the interval indicator 15 includes at least one of time difference information and distance information, which indicate the service interval 16 or 26.

Using the user interfaces shown in FIGS. 3 and 4 according to embodiments, since a vehicle operator may intuitively recognize the service states and the service intervals, the vehicle operator may efficiently manage the service schedule of the operating vehicle.

Figure 5:
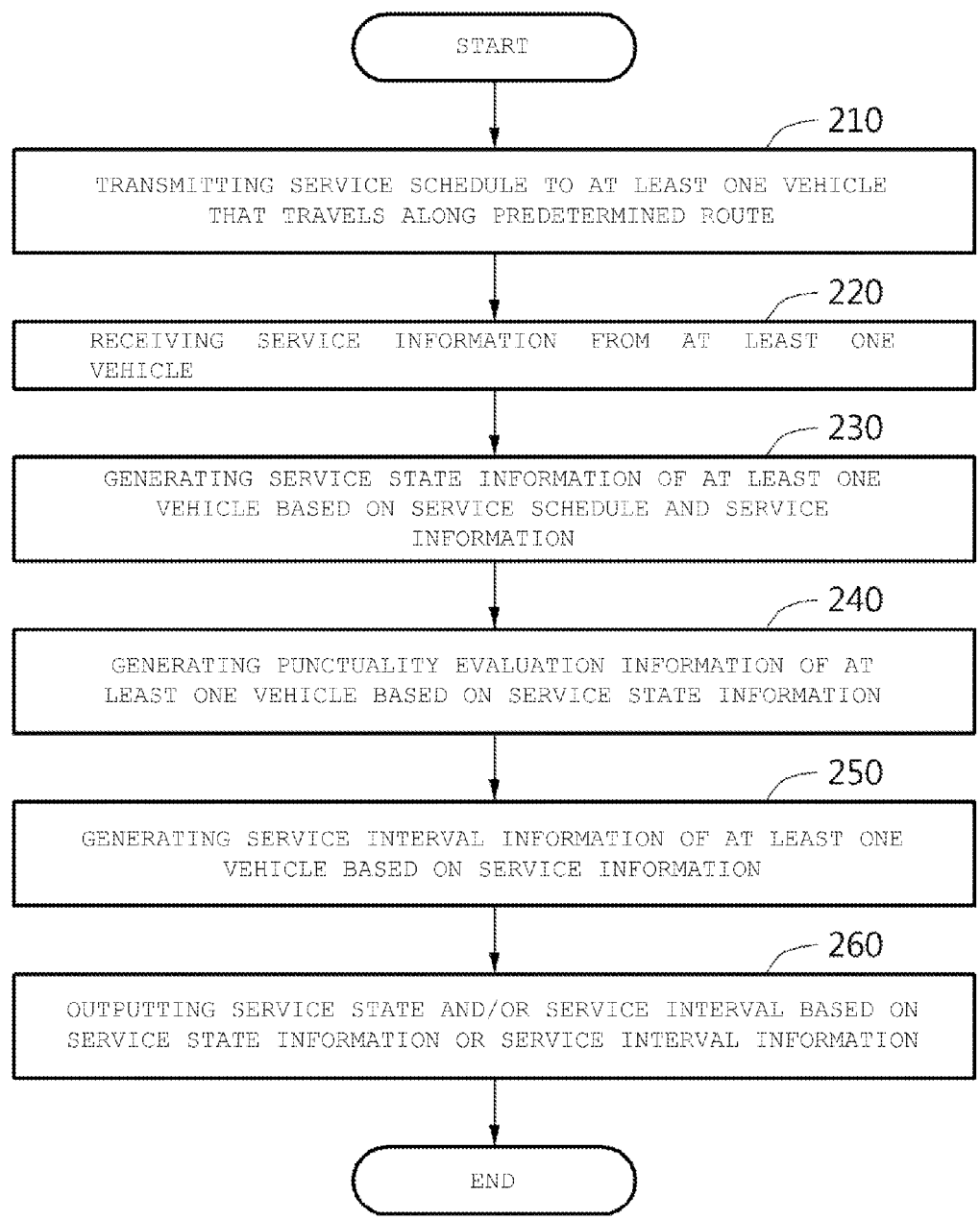
FIG. 5 is a flowchart illustrating a service schedule managing method of a control server according to an embodiment.

FIG. 5 is a flowchart illustrating a service schedule managing method of a control server according to an embodiment.

Figure 9:
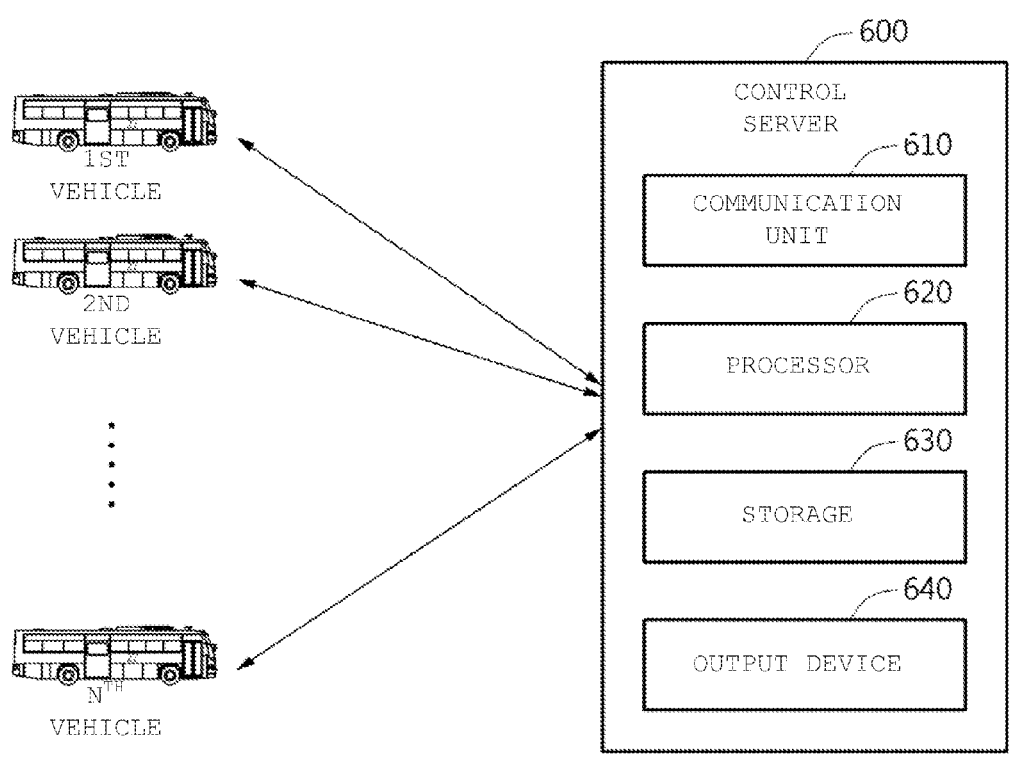
FIG. 9 is a block diagram illustrating a control server according to an embodiment.

A control server 600 shown in FIG. 9 may perform a service schedule managing method according to an embodiment of the present disclosure. In an embodiment, the control server 600 provides a vehicle operation manager with information associated with a service schedule. Hereinafter, a service scheduling method performed by the control server 600 will be described with reference to FIGS. 5 and 6.

Referring to FIG. 5, at step 210, the control server 600 transmits a service schedule to a service scheduling device 500 of at least one vehicle that travels along a predetermined route. For convenience of illustration, the description below provided with reference to FIG. 5 describes a method in accordance with an embodiment in which various operations are performed with respect to one vehicle. However, embodiments are not limited thereto, and operations described with reference to FIG. 5 may be performed to manage a plurality of vehicles.

At step 220, the control server 600 receives service information from the service scheduling device 500 of at least one vehicle. The service information may be generated based on position information of the at least one vehicle. In an embodiment, the service information includes arrival times of a vehicle that respectively correspond a plurality of nodes. Each of the arrival times refers to an actual arrival time of the vehicle, which is generated based on the position information of the vehicle.

At step 230, the control server 600 generates service state information of the vehicle based on the result of comparison between the service schedule and the service information. The service state information indicates whether the vehicle adheres to the service schedule while traveling along the predetermined route. In an embodiment, the service state information includes time difference information or distance information. In an embodiment, the service state information indicates whether the vehicle is temporally delayed as compared to the service schedule or whether the vehicle deviates from an expected position based on the service schedule. For example, the service state information includes a time difference between the expected arrival time of the vehicle at a specific node and the actual arrival time of the vehicle at the specific node. Based on the time difference of the expected and actual arrival times, the control server 600 determines whether the vehicle observes the service schedule.

At step 240, the control server 600 generates punctuality evaluation information of the plurality of vehicles based on the service state information. The punctuality evaluation information indicates how closely each of the vehicles adheres to the service schedule. Generating punctuality evaluation information in accordance with an embodiment will be described in more detail below with reference to FIG. 7.

At step 250, the control server 600 generates service interval information of the plurality of vehicles based on the service information. In an embodiment, the service interval information includes at least one of time difference information and distance information between two consecutive vehicles. In an embodiment, the service interval information includes distance information based on the position information of the consecutive vehicles. In an embodiment, the service interval information includes the time difference information and/or distance information corresponding to the plurality of nodes disposed along substantially the entire length of the route of the vehicles. In an embodiment, the service interval information includes the time difference information and/or distance information corresponding to a specific node. For example, the service interval information may include time difference information based on the actual arrival times of the consecutive vehicles at the specific node.

At step 260, the control server 600 outputs service states and/or service intervals. Outputting the service states and/or the service intervals will be described below in more detail with reference to FIG. 6.

Figure 6:
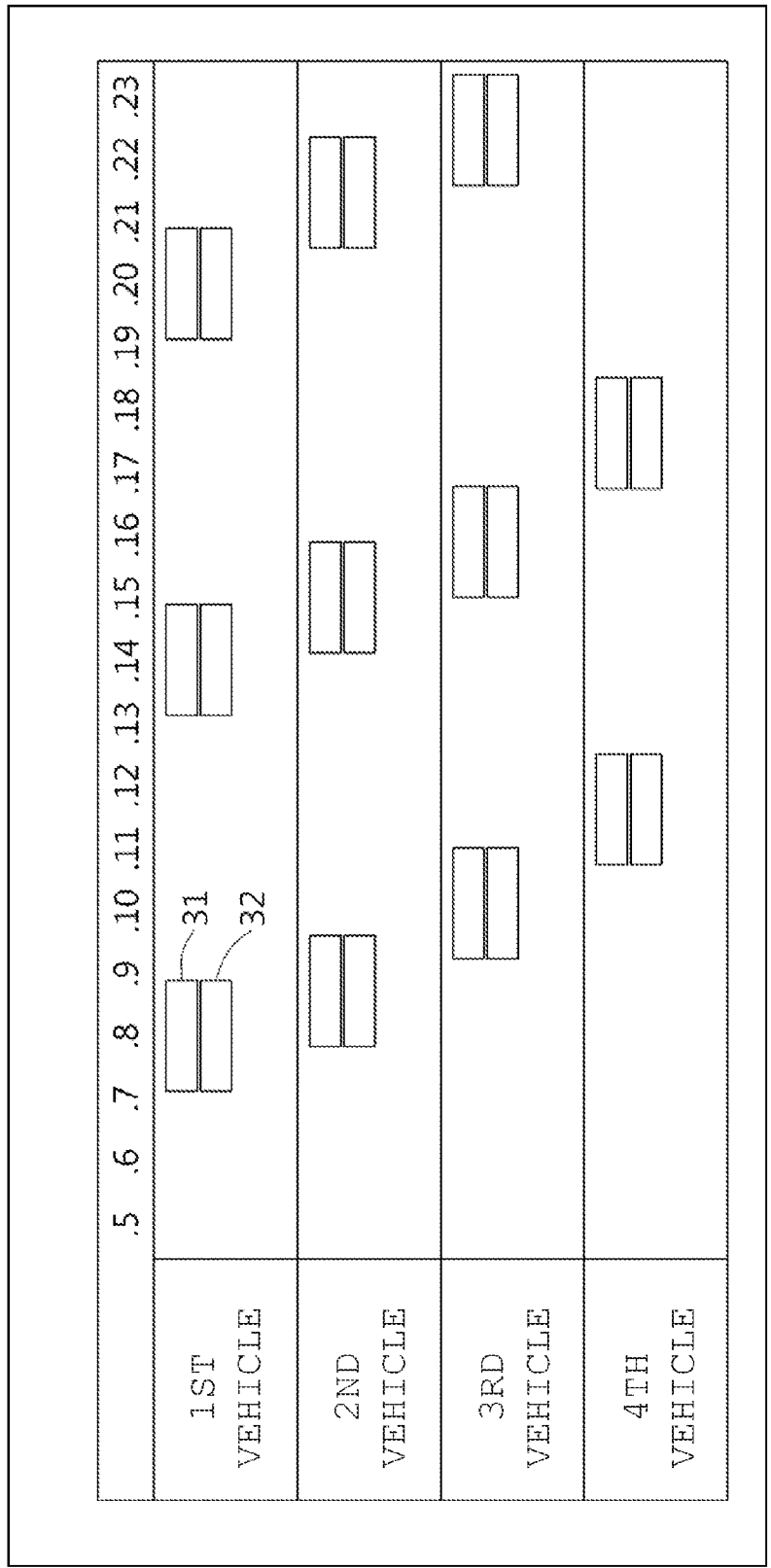
FIG. 6 is a diagram illustrating a user interface for displaying service states of a plurality of vehicles according to an embodiment.

FIG. 6 is a diagram illustrating a user interface for displaying service states of first to fourth vehicles in a screen 40 according to an embodiment.

FIG. 6 shows expected arrival times 31 and actual arrival times 32 of the first to fourth vehicles. In an embodiment, a difference between one of the expected arrival times 31 and a corresponding one of the actual arrival times 32 is output and displayed on a user interface. Based on the expected arrival times 31 and the actual arrival times 32 of the first to fourth vehicles, a vehicle operation manager may intuitively and quickly determine the service states of the first to fourth vehicles.

In an embodiment, the expected arrival times 31 and the actual arrival times 32 of the first to fourth vehicles are sequentially output according to the service sequence of the first to fourth vehicles. Based on the expected arrival times 31 and actual arrival times 32, which are sequentially output and displayed on the user interface, the vehicle operation manager may intuitively and quickly determine the service intervals of the first to fourth vehicles.

In an embodiment, based on the service state information, the user interface outputs a first indicator indicating that a corresponding vehicle is traveling faster than the service schedule, or a second indicator indicating that the vehicle is traveling slower than the service schedule. In an embodiment, the user interface outputs one or both of time difference information and distance information between two consecutive vehicles based on the service interval information.

Figure 7:
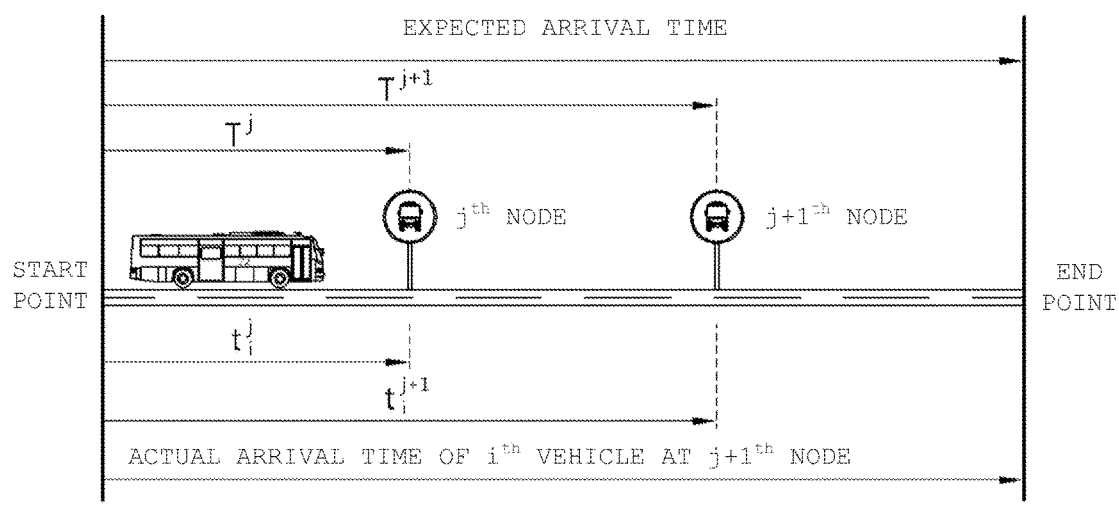
FIG. 7 is a diagram illustrating a process of generating punctuality evaluation information according to an embodiment.

FIG. 7 is a diagram illustrating a process of generating punctuality evaluation information according to an embodiment.

Referring to FIG. 7, a vehicle and a plurality of nodes are illustrated. In FIG. 7, a start point and an end point correspond to the first and last nodes included in a predetermined route, respectively. In an embodiment, at least one of the service scheduling device 500 and the control server 600 generates punctuality evaluation information based on the following equations.

In an embodiment, punctuality evaluation information TCV is represented as Equation 1 below:

$$TCV = \frac{1}{J}\sum_{j=1}^{J} \frac{S^j}{T^j}. \quad \text{[Equation 1]}$$

In the above equation, J is the number of the plurality of nodes included in the predetermined route, j is an index of the $j^{th}$ node (e.g., a station), $T^j$ is an expected arrival time at the $j^{th}$ node, and $S^j$ is a standard deviation of actual arrival times of a plurality of vehicles at the $j^{th}$ node with respect to expected arrival times of the vehicles at the same node. In an embodiment, the expected arrival time $T^j$ and the actual arrival time correspond to the expected and the actual time, respectively, that it takes for a vehicle to travel from the start point to the $j^{th}$ node.

In an embodiment, the standard deviation $S^j$ at the $j^{th}$ node may be expressed as Equation 2 below:

$$S^j = \sqrt{\frac{1}{N}\sum_{i=1}^{N} (t_i^j - T^j)^2}. \quad \text{[Equation 2]}$$

In Equation 2, N is the number of service times of the vehicles, that is, the number of vehicles traveling along the same route, and $t_i^j$ is an actual arrival time of an $i^{th}$ vehicle at the $j^{th}$ node.

In an embodiment, at least one of the service scheduling device 500 and the control server 600 generates punctuality evaluation information of the plurality of vehicles using Equation 3 below:

$$TCV = \frac{S}{T}. \quad \text{[Equation 3]}$$

In Equation 3, TCV is the punctuality evaluation information, T is an expected arrival time at the end point, and S is a standard deviation of actual arrival times of the plurality of vehicles at the end point with respect to expected arrival times of the vehicles at the end point.

In an embodiment, the standard deviation S may be expressed as Equation 4 below:

$$S = \sqrt{\frac{1}{N}\sum_{i=1}^{N}(t_i - T)^2}.$$ [Equation 4]

In Equation 4, N is the number of service times of the vehicles, that is, the number of vehicles travelling along the same route, and $t_i$ is an actual traveling time of an $i^{th}$ vehicle from the start point to the end point.

In an embodiment, at least one of the service scheduling device 500 and the control server 600 vehicle generates punctuality evaluation information of the plurality of vehicles from the first node to the second node, based on the service schedule and the service state information. Herein, the first node and the second node may be any pair of nodes selected from the plurality of nodes, for example, the start point and the end point. Using the punctuality evaluation information, a vehicle operator and/or a vehicle operation manager may evaluate the service of the vehicle, and thus efficiently manage the service schedule.

FIG. 8 is a block diagram illustrating a service scheduling device 500 according to an embodiment.

Referring to FIG. 8, a service scheduling device 500 includes a communication unit 510, a processor 520, a storage 530, and an output device 540. The above-described service schedule managing methods may be implemented as a computer code executed by a processor. The service scheduling device 500 may be any of a desktop computer, a notebook computer, a laptop computer, a netbook computer, a mobile phone, a smart phone, a personal media player (PMP), a personal digital assistant (PDA), or a hand-held electronic device.

The communication unit 510 receives and/or transmits information associated with service schedule management. In an embodiment, the communication unit 510 as a part of the service scheduling device 500 installed in a vehicle receives information associated with service schedule management from the control server 600 and another vehicle traveling before or after the vehicle, or transmits the information to the control server 600 and the other vehicle. The communication unit 510 may include various communication modules operating according to various communication standards.

The processor 520 processes the information associated with service schedule management. In an embodiment, the processor 520 processes any of schedule information, service information, service state information, punctuality evaluation information, service interval information, and a combination thereof. For example, the processor 520 calculates a difference between the expected and actual arrival times of a vehicle based on the service schedule and the service information of the vehicle, respectively. The processor 520 may generate punctuality evaluation information of a plurality of vehicles travelling from the first node to the second node, based on the service state information of the plurality of vehicles. In addition, the processor 520 may generate service interval information based on the service information of two adjacent vehicles. In an embodiment, the processor 520 executes computer-readable code to cause the service scheduling device 500 to perform one or more methods in accordance with embodiments.

The storage 530 stores information associated with service schedule management. For example, the storage 530 stores the service schedule information of the vehicle and/or the service information of a subsequent vehicle received by the communication unit 510. In an embodiment, the storage 530 includes a non-transitory computer-readable storage medium, such as a read only memory (ROM) and a random access memory (RAM), and also a higher capacity non-transitory computer readable storage medium. One or more of these components may be employed in the service scheduling device 500 to store a computer code including instructions for managing the service schedule.

The output device 540 outputs any of schedule information, service information, service state information, punctuality evaluation information, service interval information, and a combination thereof, through the user interface. The above descriptions referencing various user interfaces, such as those illustrated in FIGS. 3, 4, and 6, may be implemented by the user interface of the output device 540 of the service scheduling device 500. Thus, in embodiments, the output device 540 includes a visual output device alone, or in combination with any of an auditory output device, such as a speaker, and a haptic output device.

FIG. 9 is a block diagram illustrating a control server 600 according to an embodiment.

Referring to FIG. 9, a control server 600 includes a communication unit 610, a processor 620, a storage 630, and an output device 640.

The communication unit 610 receives and/or transmits information associated with service schedule management. In an embodiment, the communication unit 610 receives or transmits the information associated with service schedule management from or to a plurality of vehicles. The communication unit 610 may include various communication modules operating according to various communication standards.

The processor 620 processes the information associated with service schedule management. In an embodiment, the processor 520 processes any of schedule information, service information, service state information, punctuality evaluation information, service interval information, or a combination thereof. For example, the processor 620 calculates a difference between the expected and actual arrival times of a vehicle based on the service schedule and the service information of the vehicle, respectively. The processor 620 may generate punctuality evaluation information of a plurality of vehicles travelling from the first node to the second node, based on the service state information of the plurality of vehicles. In addition, the processor 620 may generate service interval information based on the service information of two consecutive vehicles. That is, in an embodiment, the processor executes computer-readable code that causes the control server 600 to perform methods in accordance with embodiments of the present disclosure.

The storage 630 stores information associated with service schedule management. For example, the storage 630 stores the service schedule information or the service information of the plurality of vehicles received by the communication unit 610. In an embodiment, the storage 630 includes a non-transitory computer-readable storage medium, such as a read only memory (ROM) and a random access memory (RAM), and also a higher capacity non-transitory computer readable storage medium. One or more of these components may be employed in the scheduling device or the control server 600 to store a computer code including instructions for managing the service schedule.

The output device 640 outputs any of schedule information, service information, service state information, punctuality evaluation information, service interval information, or a combination thereof, through a user interface. The above descriptions referencing various user interfaces, such as those shown in FIGS. 3, 4, and 6, may be implemented by the user interface of the output device 640 of the control server 600. Thus, in an embodiment, the output device 640 includes a visual output device alone, or in combination with any of an auditory output device, such as a speaker, and a haptic output device.

The methods according to embodiments of the present disclosure may be implemented in the form of program commands which can be executed through various computer units, and then written to computer readable media. The computer readable media may include a program command, a data file, a data structure, or a combination thereof. The program commands written to the media may be specially designed and configured for embodiments of the present disclosure. Examples of the computer readable media may include magnetic media such as a hard disk, a floppy disk and a magnetic tape, optical media such as CD-ROM and DVD, magneto-optical media such as a floptical disk, and hardware devices, such as ROM, RAM and flash memory, configured to store and execute a program command. Examples of the program command may include a machine language code created by a compiler and a high-level language code executed by a computer through an interpreter or the like. The hardware device may be configured to operate as one or more software modules to perform the operation of embodiments of the present disclosure and vice versa.

While the present disclosure has been described with reference to some embodiments and drawings, various changes and modifications may be possible.

Thus, the scope of the present disclosure is not be limited by the foregoing embodiments, and is defined by the following claims, and equivalents to the claims.

What is claimed is:

1. A method of managing a service schedule, the method comprising:
   receiving, from a control server, a service schedule of a first vehicle traveling along a predetermined route by a service scheduling device, wherein the service scheduling device is installed in the first vehicle;
   obtaining position information of the first vehicle by a position collecting device installed in the first vehicle;
   generating first service information of the first vehicle based on the position information of the first vehicle by the service scheduling device;
   generating service state information of the first vehicle based on the service schedule and the first service information by the service scheduling device;
   displaying the service state information of the first vehicle on a user interface of the first vehicle;
   receiving second service information of a second vehicle from the second vehicle, the second vehicle traveling subsequent to the first vehicle and along the predetermined route;
   generating first service interval information of the first and second vehicles based on the first service information and the second service information, the first service interval information including time difference information between the first vehicle and the second vehicle;
   receiving third service information of a third vehicle from the third vehicle, the third vehicle traveling subsequent to the second vehicle and along the predetermined route;
   generating second service interval information of the second and third vehicles based on the second service information and the third service information; and
   displaying the first service interval information and the second service interval information on the user interface,
   wherein displaying the service state information of the first vehicle includes displaying a state indicator, a first indicator, and a second indicator, the first indicator indicating an actual position of the first vehicle, the second indicator indicating an expected position of the first vehicle,
   wherein the state indicator points in a first direction from the first indicator to the second indicator when the first vehicle is behind the service schedule, and the state indicator points in a second direction opposite to the first direction when the first vehicle is ahead of the service schedule, and
   wherein displaying the first and second service interval information includes displaying a third indicator, a fourth indicator, a fifth indicator, and an interval indicator disposed below the fourth indicator, the third indicator indicating a first service state of the first vehicle, the fourth indicator indicating a second service state of the second vehicle, the fifth indicator indicating a third service state of the third vehicle, the interval indicator indicating the first service interval information and the second service interval information.

2. The method of claim 1, wherein the service schedule includes expected arrival times of the first vehicle at a plurality of nodes included in the predetermined route, and
   wherein the first service information includes actual arrival times of the first vehicle at the plurality of nodes.

3. The method of claim 2, wherein the plurality of nodes includes a first node, and
   wherein the service state information includes a difference between an expected arrival time of the first vehicle at the first node and an actual arrival time of the first vehicle at the first node.

4. The method of claim 1, wherein the predetermined route includes a first node and a second node, the method further comprising:
   generating punctuality evaluation information of the first vehicle traveling from the first node to the second node based on the service state information.

5. The method of claim 1, wherein the predetermined route includes a first node and a second node, the method further comprising:
   generating punctuality evaluation information of the first and second vehicles traveling from the first node to the second node based on a standard deviation of the first service information of the first vehicle and the second service information of the second vehicle at the second node.

6. The method of claim 5, wherein the first service interval information further includes distance information between the first vehicle and the second vehicle.

7. The method of claim 6,
   wherein the interval indicator indicates one or both of the time difference information between the first vehicle and the second vehicle and the distance information between the first vehicle and the second vehicle on the user interface.

8. The method of claim 1, wherein the time difference information between the first and second vehicles corresponds to a time difference between a first actual arrival time of the first vehicle at a specific node and a second actual arrival time of the second vehicle at the specific node.

9. The method of claim 1, wherein the interval indicator includes a first number and a second number, the first number indicates a first service interval between the first vehicle and the second vehicle, and the second number indicates a second interval between the second vehicle and the third vehicle.

10. A method of managing a service schedule, the method comprising:
transmitting the service schedule from a control server to a first vehicle of one or more vehicles that travel along a predetermined route;
receiving first service information from the first vehicle by the control server;
generating service state information of the first vehicle based on the service schedule and the first service information by the control server;
displaying the service state information of the first vehicle on a user interface by the control server;
receiving second service information of a second vehicle by the control server, the second vehicle of the one or more vehicles traveling subsequent to the first vehicle and along the predetermined route;
generating first service interval information of the first and second vehicles based on the first service information and the second service information, the first service interval information including time difference information between the first vehicle and the second vehicle;
receiving third service information of a third vehicle from the third vehicle, the third vehicle of the one or more vehicles traveling subsequent to the second vehicle and along the predetermined route;
generating second service interval information of the second and third vehicles based on the second service information and the third service information; and
displaying the first service interval information and the second service interval information on the user interface,
wherein displaying the service state information includes displaying a state indicator, a first indicator, and a second indicator, the first indicator indicating an actual position of the first vehicle, the second indicator indicating an expected position of the first vehicle,
wherein the state indicator points in a first direction from the first indicator to the second indicator when the first vehicle is behind the service schedule, and the state indicator points in a second direction opposite to the first direction when the first vehicle is ahead of the service schedule,
wherein the first service information is generated based on position information of the first vehicle, and
wherein displaying the first and second service interval information includes displaying a third indicator, a fourth indicator, a fifth indicator, and an interval indicator disposed below the fourth indicator, the third indicator indicating a first service state of the first vehicle, the fourth indicator indicating a second service state of the second vehicle, the fifth indicator indicating a third service state of the third vehicle, the interval indicator indicating the first service interval information and the second service interval information.

11. The method of claim 10, wherein the service schedule includes expected arrival times of the first vehicle at a plurality of nodes included in the predetermined route,
wherein the first service information includes actual arrival times of the first vehicle at the plurality of nodes, and
wherein the service state information includes a difference between one of the expected arrival times at a node and a corresponding one of the actual arrival times at the node.

12. The method of claim 10, wherein the predetermined route includes a first node and a second node, the method further comprising:
generating punctuality evaluation information of the first vehicle traveling from the first node to the second node based on the service state information.

13. The method of claim 10, the predetermined route includes a first node and a second node, the method further comprising:
generating punctuality evaluation information of the first and second vehicles traveling from the first node to the second node based on a standard deviation of the first service information of the first vehicle and the second service information of the second vehicle at the second node.

14. The method of claim 13,
wherein the interval indicator indicates at least one of the time difference information between the first vehicle and the second vehicle and distance information between the first vehicle and the second vehicle.

15. A service schedule device for managing a service schedule of a first vehicle, wherein the device is installed in the first vehicle, the device comprising:
a processor;
an output device; and
a non-transitory computer-readable medium having stored thereon a program that, when executed, causes the processor to perform a method, the method comprising:
receiving the service schedule of the first vehicle that travels along a predetermined route from a control server;
generating first service information of the first vehicle based on position information of the first vehicle, the position information of the first vehicle being obtained by a position collecting device, the position collecting device being installed in the first vehicle;
generating service state information of the first vehicle, based on the service schedule and the first service information;
displaying the service state information of the first vehicle on a user interface of the output device;
receiving second service information of a second vehicle from the second vehicle, the second vehicle traveling subsequent to the first vehicle and along the predetermined route;
generating first service interval information of the first and second vehicles based on the first service information and the second service information, the first service interval information including time difference information between the first vehicle and the second vehicle,
receiving third service information of a third vehicle from the third vehicle, the third vehicle traveling subsequent to the second vehicle and along the predetermined route;
generating second service interval information of the second and third vehicles based on the second service information and the third service information; and
displaying the first service interval information and the second service interval information on the user interface, wherein displaying the service state information includes displaying a state indicator, a first indicator, and a second indicator, the first indicator indicating an actual position of the first vehicle, the second indicator indicating an expected position of the first vehicle, wherein the state indicator points in a first direction from the first indicator to the second indicator when the first vehicle is behind the service schedule, and the state indicator points in a second direction opposite to the first direction when the first vehicle is ahead of the service schedule, and wherein displaying the first and second service interval information includes displaying a third indicator, a fourth indicator, a fifth indicator, and an interval indicator disposed below the fourth indicator, the third indicator indicating a first service state of the first vehicle, the fourth indicator indicating a second service state of the second vehicle, the fifth indicator indicating a third service state of the third vehicle, the interval indicator indicating the first service interval information and the second service interval information.

16. The device of claim 15, wherein the predetermined route includes a first node and a second node, the method further comprising:
generating punctuality evaluation information of the first vehicle traveling from the first node to the second node based on the service state information.

17. The device of claim 15, wherein the predetermined route includes a first node and a second node, the method further comprising:
generating punctuality evaluation information of the first and second vehicles traveling from the first node to the second node based on a standard deviation of the first service information of the first vehicle and the second service information of the second vehicle at the second node.

18. The device of claim 17, wherein the interval indicator indicates at least one of the time difference information between the first vehicle and the second vehicle and distance information between the first vehicle and the second vehicle based on the first service interval information on the user interface of the output device.

* * * * *